(No Model.)

W. LAURIA.
TWO WHEELED VEHICLE.

No. 406,919.  Patented July 16, 1889.

Witnesses:

Inventor
Warren Lauria
By Lucius C. West
Att'y

United States Patent Office.

WARREN LAURIA, OF KALAMAZOO, MICHIGAN.

TWO-WHEELED VEHICLE.

SPECIFICATION forming part of Letters Patent No. 406,919, dated July 16, 1889.

Application filed January 5, 1889. Serial No. 295,504. (No model.)

*To all whom it may concern:*

Be it known that I, WARREN LAURIA, a citizen of the United States, residing at Kalamazoo, county of Kalamazoo, State of Michigan, have invented a new and useful Two-Wheeled Vehicle, of which the following is a specification.

This invention relates to the well-known class of two-wheeled vehicles, the bodies or seat-bars of which are hinged or fulcrumed to the thills or cross-bar of the thills at the forward end and are elastically supported over the axle.

The object of the invention consists in the construction of a peculiar elastic support for the fulcrumed body and in combining it therewith, substantially as below described and claimed.

Figure 1:
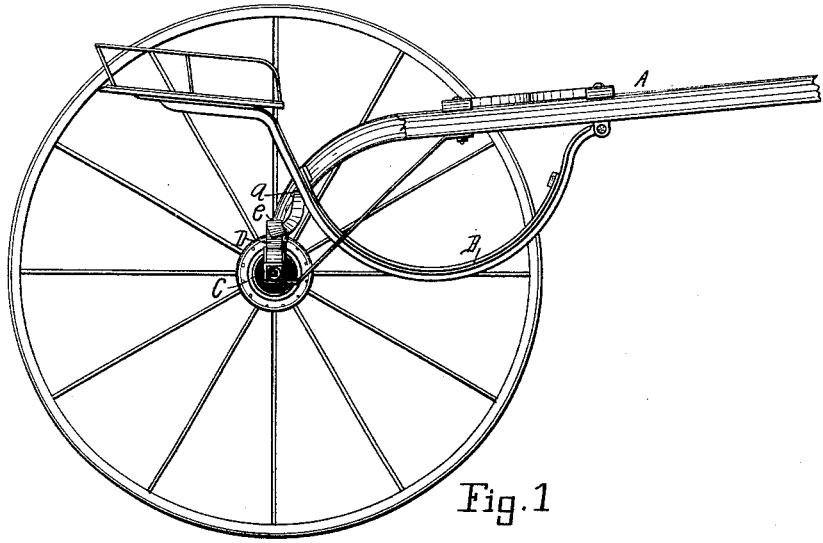
Figure 2:
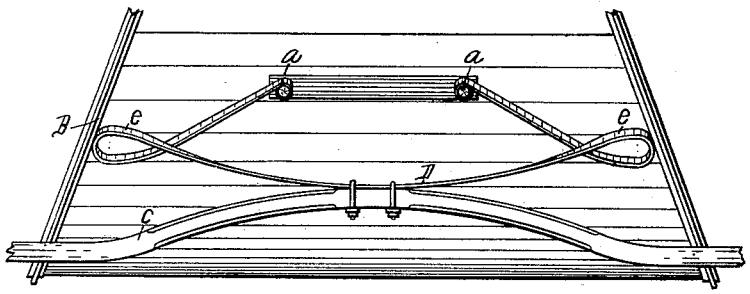
Figure 3:
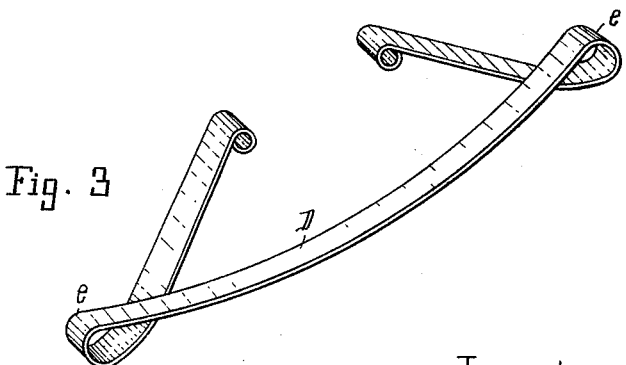

In the drawings forming a part of this specification, Figure 1 is a side elevation with one wheel removed; Fig. 2, a rear elevation of lettered parts looking from a point at the left of Fig. 1; and Fig. 3 is a perspective view of the elastic support or spring enlarged.

Referring to the lettered parts of the drawings, A are the thills, B the body fulcrumed at the forward end, and C the wheeled axle, substantially as heretofore constructed. The spring or elastic support D consists of the semi-elliptic member, which is attached centrally on the axle C, as in Fig. 2. From the outer ends of the semi-elliptic member the spring is bent around, downwardly, thence upwardly, and toward each other, flatwise in plan view, forming complete loops in rear elevation, with the edge of the flat metal of which the spring is composed presented to the rear.

Having thus described my invention, what I claim as new, and desire to secure by Letters Patent of the United States, is—

In a two-wheeled vehicle, the combination of the body fulcrumed at the forward end, the axle, and the spring consisting of the semi-elliptic member, the ends of said member being bent around, downward, thence upward, flatwise, forming complete loops in rear elevation, with the edges of the bar forming said loops presented to the rearward, thence extended upward toward each other and attached to the body by vertical pivots, substantially as set forth.

In testimony of the foregoing I have hereunto subscribed my name in presence of two witnesses.

WARREN LAURIA.

Witnesses:
LUCIUS C. WEST,
JOHN H. CHASE.